(12) United States Patent
Liu et al.

(10) Patent No.: US 10,990,500 B2
(45) Date of Patent: Apr. 27, 2021

(54) SYSTEMS AND METHODS FOR USER ANALYSIS

(71) Applicant: BEIJING DIDI INFINITY TECHNOLOGY AND DEVELOPMENT CO., LTD., Beijing (CN)

(72) Inventors: Yuexiang Liu, Beijing (CN); Zang Li, Beijing (CN); Lifeng Cao, Beijing (CN); Zhihua Chang, Beijing (CN); Hongbo Ling, Beijing (CN); Xiang Xu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/075,681

(22) Filed: Oct. 20, 2020

(65) Prior Publication Data

US 2021/0034493 A1 Feb. 4, 2021

Related U.S. Application Data

(63) Continuation of application No. PCT/CN2018/087439, filed on May 18, 2018.

(51) Int. Cl.
*G06F 11/34* (2006.01)
*G06F 17/16* (2006.01)
*G06N 20/00* (2019.01)

(52) U.S. Cl.
CPC .......... *G06F 11/3438* (2013.01); *G06F 17/16* (2013.01); *G06N 20/00* (2019.01)

(58) Field of Classification Search
CPC .. G06F 16/9535; G06F 11/3438; G06F 17/16; G06N 20/00; G06K 9/6215; G06K 9/623
See application file for complete search history.

(56) References Cited

U.S. PATENT DOCUMENTS

| | | | |
|---|---|---|---|
| 9,547,679 B2 * | 1/2017 | Whitman | G06F 16/9535 |
| 2012/0054040 A1 | 3/2012 | Bagherjeiran et al. | |

(Continued)

FOREIGN PATENT DOCUMENTS

| | | |
|---|---|---|
| CN | 105427129 A | 3/2016 |
| CN | 106204063 A | 12/2016 |

(Continued)

OTHER PUBLICATIONS

International Search Report in PCT/CN2018/087439 dated Feb. 22, 2019, 4 pages.

(Continued)

*Primary Examiner* — Elias Desta
(74) *Attorney, Agent, or Firm* — Metis IP LLC

(57) ABSTRACT

A method for user mining is provided. The method may include obtaining a plurality of first feature vectors of a plurality of positive samples and a plurality of second feature vectors of a plurality of negative samples, and generating a plurality of expanded first feature vectors based on the plurality of first feature vectors and second feature vectors and expanded second feature vectors. Each first feature vector may include first feature information that describes a plurality of features of a corresponding positive sample. Each second feature vector may include second feature information that describes a plurality of features of a corresponding negative sample. The method may further include determining one or more core features related to the plurality of positive samples among the plurality of features corresponding to the plurality of first feature vectors based on a trained binary model.

20 Claims, 7 Drawing Sheets

(56) References Cited

U.S. PATENT DOCUMENTS

| | | | |
|---|---|---|---|
| 2013/0124298 A1 | 5/2013 | Li et al. | |
| 2016/0162757 A1 | 6/2016 | Chen et al. | |
| 2016/0239738 A1 | 8/2016 | Feng et al. | |
| 2017/0039622 A1 | 2/2017 | Chen et al. | |
| 2018/0053114 A1* | 2/2018 | Adjaoute | G06N 3/126 |
| 2018/0091950 A1 | 3/2018 | Zhang | |
| 2019/0102652 A1* | 4/2019 | Zhang | G06K 9/6272 |

FOREIGN PATENT DOCUMENTS

| | | |
|---|---|---|
| CN | 107092919 A | 8/2017 |
| CN | 107194488 A | 9/2017 |
| CN | 107330429 A | 11/2017 |
| CN | 107506786 A | 12/2017 |
| WO | 2016145402 A1 | 9/2016 |

OTHER PUBLICATIONS

Written Opinion in PCT/CN2018/087439 dated Feb. 22, 2019, 4 pages.

\* cited by examiner

SYSTEMS AND METHODS FOR USER ANALYSIS

CROSS-REFERENCE TO RELATED APPLICATIONS

This application is a continuation of International Patent Application No. PCT/CN2018/087439, filed on May 18, 2018, the entire contents of which are hereby incorporated by reference.

TECHNICAL FIELD

The present disclosure generally relates to user analysis, and more specifically, to systems and methods for mining features of users and generating a virtual profile of the users.

BACKGROUND

In internet technologies, user feature mining is often the key in the development and operation of a service system. By user feature mining, the features of various user types may be identified and quantified, thus providing a basis for user classification, personalized service and marketing. Merely by way of example, core features of a plurality of active users in the service system may be determined, and such core features can be used to identify potential active users who have similar features as the active users. Accordingly, an active marketing strategy may be adopted for the identified potential active users. Thus, it is desirable to provide effective systems and methods for mining user features.

SUMMARY

In one aspect of the present disclosure, a system is provided. The system may include at least one storage medium and at least one processor in communication with the at least one storage medium. The storage medium may include a set of instructions for user mining. When executing the set of instructions, the at least one processor may be directed to obtain a plurality of first feature vectors of a plurality of positive samples and a plurality of second feature vectors of a plurality of negative samples. Each first feature vector may include first feature information that describes a plurality of features of a corresponding positive sample in the plurality of positive samples. Each second feature vector may include second feature information that describes a plurality of features of a corresponding negative sample in the plurality of negative samples. The at least one processor may be also directed to generate a plurality of expanded first feature vectors and a plurality of expanded second feature vectors based on the plurality of first feature vectors and the plurality of second feature vectors. The at least one processor may be further directed to determine one or more core features related to the plurality of positive samples among the plurality of features corresponding to the plurality of first feature vectors based on a trained binary model, which is produced by using the plurality of expanded first feature vectors and the plurality of expanded second feature vectors.

In some embodiments, to obtain the plurality of first feature vectors of the plurality of positive samples, the at least one processor may be directed to obtain one or more selection criteria related to one or more target features, and obtain third feature information of the one or more target features of a plurality of samples. The at least one processor may be further directed to select the plurality of positive samples from the plurality of samples based on the third feature information and the one or more selection criteria.

In some embodiments, to obtain the plurality of second feature vectors of the plurality of negative samples, the at least one processor may be directed to select a plurality of preliminary negative samples among the plurality of samples. The at least one processor may be also directed to obtain fourth feature information of the one or more target features of the plurality of preliminary negative samples. The at least one processor may be further directed to select the plurality of negative samples among the plurality of preliminary negative samples based on the fourth feature information and the one or more selection criteria.

In some embodiments, to determine the plurality of expanded first feature vectors and the plurality of expanded second feature vectors, the at least one processor may be directed to determine a first vector difference between each pair of first feature vectors among the first feature vectors, and designate the first vector difference between each pair of first feature vectors among the first feature vectors as one of the expanded first feature vectors. The at least one processor may also be further directed to determine a second vector difference between each pair of a first feature vector and a second feature vector, and designate the second vector difference between each pair of a first feature vector and a second feature vector as one of the expanded second feature vectors.

In some embodiments, to determine the plurality of expanded first feature vectors and the plurality of second feature vectors, the at least one processor may be directed to normalize the plurality of first feature vectors and the plurality of second feature vectors. The at least one processor may be further directed to determine the plurality of expanded first feature vectors and the plurality of expanded second feature vectors based on the plurality of normalized first feature vectors and the plurality of normalized second feature vectors.

In some embodiments, to determine the one or more core features related to the plurality of positive samples, the at least one processor may be directed to determine a plurality of weights of the plurality of features corresponding to the plurality of first feature vectors based on the trained binary model. The at least one processor may be also directed to rank the plurality of features corresponding to the plurality of first feature vectors according to the plurality of weights. The at least one processor may be further directed to determine the one or more core features among the features based on a ranking result.

In some embodiments, the at least one processor may be further directed to generate a virtual profile of the plurality of positive samples based on the one or more core features and the plurality of first feature vectors. Each of the one or more core features may have a corresponding first reference value in the virtual profile.

In some embodiments, to generate the virtual profile of the plurality of positive samples, the at least one processor may be directed to determine an average feature value for each of the one or more core features based on the plurality of first feature vectors. The at least one processor may be directed to designate the average feature value as the first reference value for the corresponding core feature for the virtual profile.

In some embodiments, to generate the virtual profile of the plurality of positive samples, the at least one processor may be directed to determine a second reference value for each of the one or more core features based on the plurality of second feature vectors. The at least one processor may be also directed to filter the plurality of first feature vectors based on the second reference value of each of the one or more core features. The at least one processor may be further directed to use the filtered first feature vectors to generate the virtual profile of the plurality of positive samples.

In some embodiments, the at least one processor may be further directed to obtain fifth feature information of one or more second core features of a plurality of samples, and identify a plurality of target samples among the plurality of samples based on the virtual profile of the positive samples and the fifth feature information.

In another aspect of the present disclosure, a method is provided. The method may be implemented on a computing device having at least one processor, at least one computer-readable storage medium, and a communication platform connected to a network. The method may include obtaining a plurality of first feature vectors of a plurality of positive samples and a plurality of second feature vectors of a plurality of negative samples. Each first feature vector may include first feature information that describes a plurality of features of a corresponding positive sample in the plurality of positive samples. Each second feature vector may include second feature information that describes a plurality of features of a corresponding negative sample in the plurality of negative samples. The method may further include generating a plurality of expanded first feature vectors and a plurality of expanded second feature vectors based on the plurality of first feature vectors and the plurality of second feature vectors. The method may further include determining one or more core features related to the plurality of positive samples among the plurality of features corresponding to the plurality of first feature vectors based on a trained binary model, which is produced by using the plurality of expanded first feature vectors and the plurality of expanded second feature vectors.

In some embodiments, the determining the one or more core features related to the plurality of positive samples may further include determining a plurality of weights of the plurality of features corresponding to the plurality of first feature vectors based on the trained binary model, ranking the plurality of features corresponding to the plurality of first feature vectors according to the plurality of weights, and determining the one or more core features among the plurality of features corresponding to the plurality of first feature vectors based on a ranking result.

In another aspect of the present disclosure, a non-transitory computer-readable medium embodying a computer program product is provided. The computer program product comprising instructions may be configured to cause a computing device to obtain a plurality of first feature vectors of a plurality of positive samples and a plurality of second feature vectors of a plurality of negative samples. Each first feature vector may include first feature information that describes a plurality of features of a corresponding positive sample in the plurality of positive samples. Each second feature vector may include second feature information that describes a plurality of features of a corresponding negative sample in the plurality of negative samples. The computer program product comprising instructions may be further configured to cause the computing device to generate a plurality of expanded first feature vectors and a plurality of expanded second feature vectors based on the plurality of first feature vectors and the plurality of second feature vectors. The computer program product comprising instructions may be further configured to cause the computing device to determine one or more core features related to the plurality of positive samples among the plurality of features corresponding to the plurality of first feature vectors based on a trained binary model, which is produced by using the plurality of expanded first feature vectors and the plurality of expanded second feature vectors.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
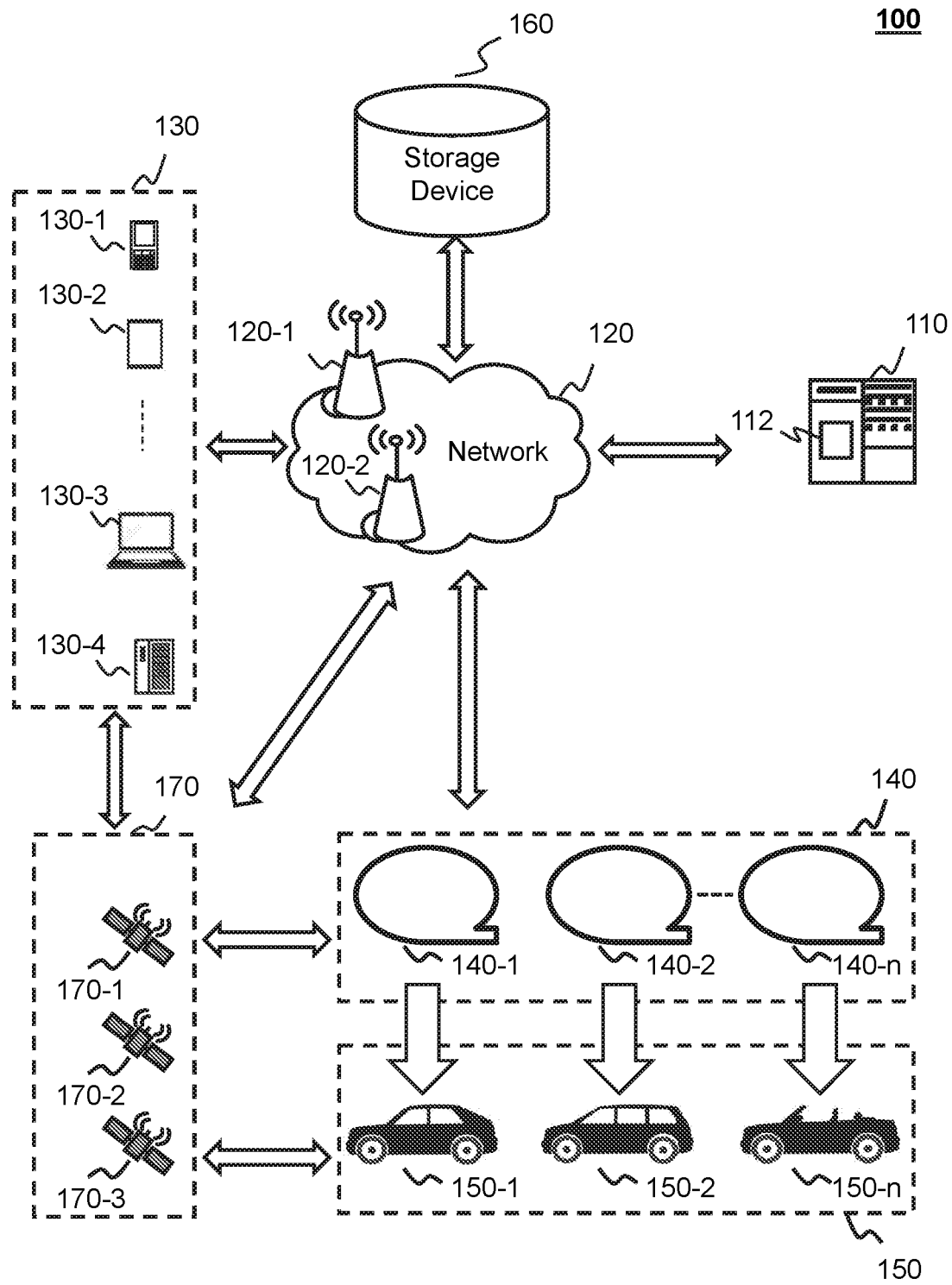
FIG. 1 is a schematic diagram illustrating an exemplary online to offline (O2O) service system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Embodiments of the present disclosure may be applied to different transportation systems including but not limited to land transportation, sea transportation, air transportation, space transportation, or the like, or any combination thereof. A vehicle of the transportation systems may include a rickshaw, travel tool, taxi, chauffeured car, hitch, bus, rail transportation (e.g., a train, a bullet train, high-speed rail, and subway), ship, airplane, spaceship, hot-air balloon, driverless vehicle, or the like, or any combination thereof. The transportation system may also include any transportation system that applies management and/or distribution, for example, a system for sending and/or receiving an express.

The application scenarios of different embodiments of the present disclosure may include but not limited to one or more webpages, browser plugins and/or extensions, client terminals, custom systems, intracompany analysis systems, artificial intelligence robots, or the like, or any combination thereof. It should be understood that application scenarios of the system and method disclosed herein are only some examples or embodiments. Those having ordinary skills in the art, without further creative efforts, may apply these drawings to other application scenarios. For example, other similar server.

The term "passenger," "requester," "requestor," "service requester," "service requestor" and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a requester, a passenger, a driver, an operator, or the like, or any combination thereof. In the present disclosure, "requester" and "requester terminal" may be used interchangeably, and "provider" and "provider terminal" may be used interchangeably.

The term "request," "service," "service request," and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The present disclosure relates to systems and methods for identifying core features of positive samples and generating a virtual profile of the positive samples. The positive samples may include any sample to be analyzed that can be identified with certain values of one or more target features. For example, the positive samples may be a plurality of service requesters that have made frequent (e.g. more than a certain number in a predetermined period of time) requests. The systems and methods may obtain a plurality of first feature vectors of the positive samples and a plurality of second feature vectors of a plurality of negative samples. The negative samples may include a plurality of samples other than the positive samples, which may serve as reference samples of the positive samples. In some embodiments, in order to enlarge the sample size for identifying core features of the positive samples, the systems and methods may generate a plurality of expanded first feature vectors and a plurality of expanded second feature vectors based on the first and second feature vectors. The expanded first feature vectors and expanded second feature vectors may be used to produce a trained binary model. The systems and methods may further determine the core features of the positive samples based on the trained binary model, and also determine a reference value of each core feature of the positive samples based on the first feature vectors. The core features, together with the corresponding reference values, may form a virtual profile of the positive samples. The virtual profile of the positive samples may further be used in user development, user classification, personalized service and marketing, or the like.

FIG. 1 is a block diagram illustrating an exemplary O2O service system 100 according to some embodiments of the present disclosure. For example, the O2O service system 100 may be an online transportation service platform for transportation services. The O2O service system 100 may include a server 110, a network 120, a requester terminal 130, a provider terminal 140, a vehicle 150, a storage device 160, and a navigation system 170.

The O2O service system 100 may provide a plurality of services. Exemplary service may include a taxi-hailing service, a chauffeur service, an express car service, a carpool service, a bus service, a driver hire service, and a shuttle service. In some embodiments, the O2O service may be any online service, such as booking a meal, shopping, or the like, or any combination thereof.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the requester terminal 130, the provider terminal 140, and/or the storage device 160 via the network 120. As another example, the server 110 may be directly connected to the requester terminal 130, the provider terminal 140, and/or the storage device 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data related to the service request to perform one or more functions described in the present disclosure. For example, the processing engine 112 may analyze feature information of a plurality of service requesters to determine one or more core features of the service requesters. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the O2O service system 100 (e.g., the server 110, the requester terminal 130, the provider terminal 140, the vehicle 150, the storage device 160, and the navigation system 170) may transmit information and/or data to other component(s) of the O2O service system 100 via the network 120. For example, the server 110 may receive a service request from the requester terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, through which one or more components of the O2O service system 100 may be connected to the network 120 to exchange data and/or information.

In some embodiments, a passenger may be an owner of the requester terminal 130. In some embodiments, the owner of the requester terminal 130 may be someone other than the passenger. For example, an owner A of the requester terminal 130 may use the requester terminal 130 to transmit a service request for a passenger B or receive a service confirmation and/or information or instructions from the server 110. In some embodiments, a service provider may be a user of the provider terminal 140. In some embodiments, the user of the provider terminal 140 may be someone other than the service provider. For example, a user C of the provider terminal 140 may use the provider terminal 140 to receive a service request for a service provider D, and/or information or instructions from the server 110. In some embodiments, "passenger" and "passenger terminal" may be used interchangeably, and "service provider" and "provider terminal" may be used interchangeably. In some embodiments, the provider terminal may be associated with one or more service providers (e.g., a night-shift service provider, or a day-shift service provider).

In some embodiments, the requester terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glasses, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift, a HoloLens, a Gear VR, etc. In some embodiments, the built-in device in the vehicle 130-4 may include an onboard computer, an onboard television, etc. In some embodiments, the requester terminal 130 may be a device with positioning technology for locating the position of the passenger and/or the requester terminal 130.

The provider terminal 140 may include a plurality of provider terminals 140-1, 140-2, . . . , 140-n. In some embodiments, the provider terminal 140 may be similar to, or the same device as the requester terminal 130. In some embodiments, the provider terminal 140 may be customized to be able to implement the on-demand transportation service 100. In some embodiments, the provider terminal 140 may be a device with positioning technology for locating the service provider, the provider terminal 140, and/or a vehicle 150 associated with the provider terminal 140. In some embodiments, the requester terminal 130 and/or the provider terminal 140 may communicate with another positioning device to determine the position of the passenger, the requester terminal 130, the service provider, and/or the provider terminal 140. In some embodiments, the requester terminal 130 and/or the provider terminal 140 may periodically transmit the positioning information to the server 110. In some embodiments, the provider terminal 140 may also periodically transmit the availability status to the server 110. The availability status may indicate whether a vehicle 150 associated with the provider terminal 140 is available to carry a passenger. For example, the requester terminal 130 and/or the provider terminal 140 may transmit the positioning information and the availability status to the server 110 every thirty minutes. As another example, the requester terminal 130 and/or the provider terminal 140 may transmit the positioning information and the availability status to the server 110 each time the user logs into the mobile application associated with the on-demand transportation service 100.

In some embodiments, the provider terminal 140 may correspond to one or more vehicles 150. The vehicles 150 may carry the passenger and travel to the destination. The vehicles 150 may include a plurality of vehicles 150-1, 150-2, . . . , 150-n. One vehicle may correspond to one type of services (e.g., a taxi-hailing service, a chauffeur service, an express car service, a carpool service, a bus service, a driver hire service, or a shuttle service).

The storage device 160 may store data and/or instructions. In some embodiments, the storage device 160 may store data obtained from the requester terminal 130 and/or the provider terminal 140. In some embodiments, the storage device 160 may store data and/or instructions that the server 110 may execute or use to perform exemplary methods described in the present disclosure. In some embodiments, storage device 160 may include a mass storage, removable storage, a volatile read-and-write memory, a read-only memory (ROM), or the like, or any combination thereof. Exemplary mass storage may include a magnetic disk, an optical disk, solid-state drives, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 160 may be connected to the network 120 to communicate with one or more components of the O2O service system 100 (e.g., the server 110, the requester terminal 130, or the provider terminal 140). One or more components of the O2O service system 100 may access the data or instructions stored in the storage device 160 via the network 120. In some embodiments, the storage device 160 may be directly connected to or communicate with one or more components of the O2O service system 100 (e.g., the server 110, the requester terminal 130, the provider terminal 140). In some embodiments, the storage device 160 may be part of the server 110.

The navigation system 170 may determine information associated with an object, for example, one or more of the requester terminal 130, the provider terminal 140, the vehicle 150, etc. In some embodiments, the navigation system 170 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The navigation system 170 may include one or more satellites, for example, a satellite 170-1, a satellite 170-2, and a satellite 170-3. The satellites 170-1 through 170-3 may determine the information mentioned above independently or jointly. The satellite navigation system 170 may transmit the information mentioned above to the network 120, the requester terminal 130, the provider terminal 140, or the vehicle 150 via wireless connections.

In some embodiments, one or more components of the O2O service system 100 (e.g., the server 110, the requester terminal 130, the provider terminal 140) may have permissions to access the storage device 160. In some embodiments, one or more components of the O2O service system 100 may read and/or modify information related to the passenger, service provider, and/or the public when one or more conditions are met. For example, the server 110 may read and/or modify one or more passengers' information after a service is completed. As another example, the server 110 may read and/or modify one or more service providers' information after a service is completed.

One of ordinary skill in the art would understand that when an element (or component) of the O2O service system 100 performs, the element may perform through electrical signals and/or electromagnetic signals. For example, when a requester terminal 130 transmits out a service request to the server 110, a processor of the requester terminal 130 may generate an electrical signal encoding the request. The processor of the requester terminal 130 may then transmit the electrical signal to an output port. If the requester terminal 130 communicates with the server 110 via a wired network, the output port may be physically connected to a cable, which further may transmit the electrical signal to an input port of the server 110. If the requester terminal 130 communicates with the server 110 via a wireless network, the output port of the requester terminal 130 may be one or more antennas, which convert the electrical signal to electromagnetic signal. Similarly, a provider terminal 130 may receive an instruction and/or service request from the server 110 via electrical signal or electromagnet signals. Within an electronic device, such as the requester terminal 130, the provider terminal 140, and/or the server 110, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
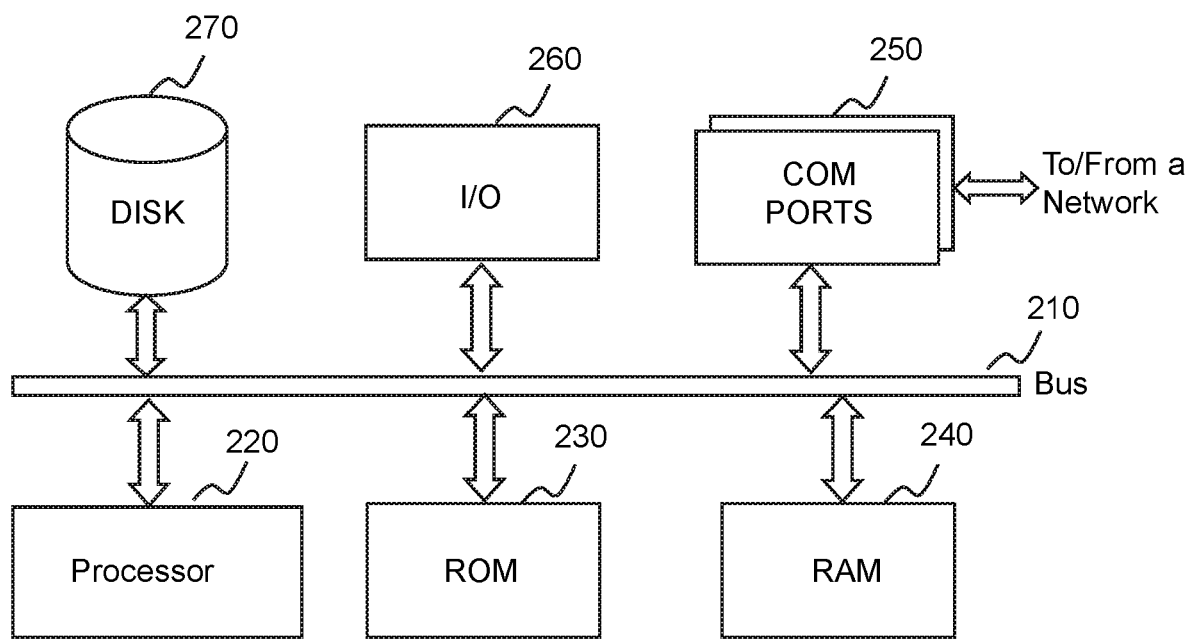
FIG. 2 is a schematic diagram illustrating exemplary hardware and software components of a computing device according to some embodiments of the present disclosure.

FIG. 2 illustrates a schematic diagram of an exemplary computing device according to some embodiments of the present disclosure. The computing device may be a computer, such as the server 110 in FIG. 1 and/or a computer with specific functions, configured to implement any particular system according to some embodiments of the present disclosure. Computing device 200 may be configured to implement any components that perform one or more functions disclosed in the present disclosure. For example, the server 110 may be implemented in hardware devices, software programs, firmware, or any combination thereof of a computer like computing device 200. For brevity, FIG. 2 depicts only one computing device. In some embodiments, the functions of the computing device, providing function that recommending pick-up locations may require, may be implemented by a group of similar platforms in a distributed mode to disperse the processing load of the system.

Computing device 200 may include a communication terminal 250 that may connect with a network that may implement the data communication. Computing device 200 may also include a processor 220 that is configured to execute instructions and includes one or more processors. The schematic computer platform may include an internal communication bus 210, different types of program storage units and data storage units (e.g., a hard disk 270, a read-only memory (ROM) 230, a random-access memory (RAM) 240), various data files applicable to computer processing and/or communication, and some program instructions executed possibly by the processor 220. Computing device 200 may also include an I/O device 260 that may support the input and output of data flows between computing device 200 and other components. Moreover, computing device 200 may receive programs and data via the communication network.

Figure 3:
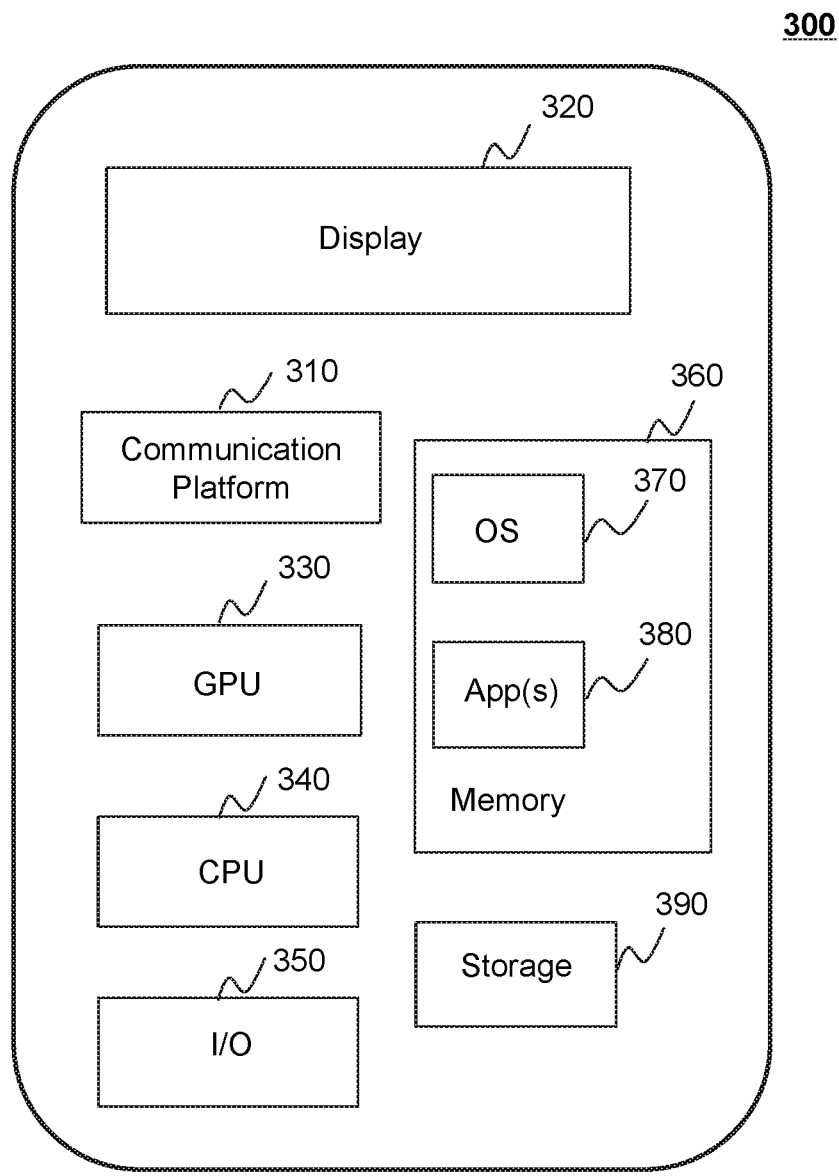
FIG. 3 is a schematic diagram illustrating exemplary hardware and/or software components of a mobile device on which a terminal may be implemented according to some embodiments of the present disclosure.

FIG. 3 is a schematic diagram illustrating exemplary hardware and/or software components of an exemplary mobile device on which a terminal may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, a mobile operating system (OS) 370, a storage 390. In some embodiments, any other suitable component, including but not limited to a system bus or a controller (not shown), may also be included in the mobile device 300.

In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the O2O service system 100. User interactions with the information stream may be achieved via the I/O 350 and provided to the database 130, the server 105 and/or other components of the O2O service system 100. In some embodiments, the mobile device 300 may be an exemplary embodiment corresponding to the requester terminal 130 or the provider terminal 140.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
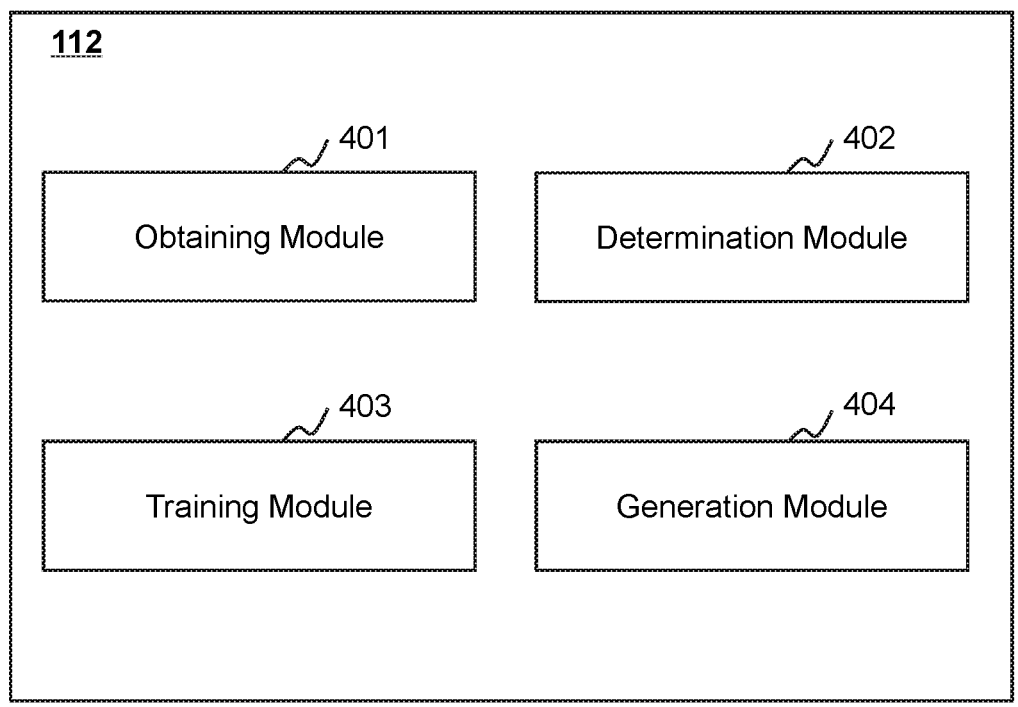
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may include an obtaining module 401, a determination module 402, a training module 403, and a generation module 404. The modules may be hardware circuits of all or part of the processing engine 112. The modules may also be implemented as an application or set of instructions read and executed by the processing engine 112. Further, the modules may be any combination of the hardware circuits and the application/instructions. For example, the modules may be the part of the processing engine 112 when the processing engine 112 is executing the application/set of instructions.

The obtaining module 401 may be configured to obtain information related to one or more components of the O2O service system 100. For example, the obtaining module 401 may obtain a feature vector of a sample, for example, a user of the O2O service system 100. The feature vector may include feature information that describes a plurality of features of the sample. As another example, the obtaining module 401 may obtain feature information related to one or more certain features of the sample. In some embodiments, the obtaining module 401 may obtain a plurality of first feature vectors of a plurality of positive samples and a plurality of second feature vectors of a plurality of negative samples. In some embodiments, the obtaining module 401 may obtain information (e.g., a feature vector or feature information of a sample) from one or more components in the O2O service system 100, for example, such as a storage device (e.g., the storage device 160), or one or more user terminals (e.g., the service requester terminal 130, the service provider terminal 140). Additionally or alternatively, the obtaining module 401 may obtain information from an external source via the network 120. For example, the obtaining module 401 may obtain feature information related to a sample from, for example but not limited to, one or more social websites, and/or a user profile database.

The determination module 402 may be configured to determine a plurality of expanded first feature vectors and a plurality of expanded second feature vectors based on the first feature vectors of the positive samples and the second feature vectors of the negative samples. In some embodiments, an expanded first feature vector may be a vector difference between a pair of first feature vectors, and an expanded second feature vector may be a vector difference between a pair of a first feature vector and a second feature vector. More descriptions regarding the determination of the expanded first and second feature vectors may be found elsewhere in the present disclosure. See, e.g., FIG. 6 and the relevant descriptions thereof.

In some embodiments, the determination module 402 may be further configured to select the positive samples and/or the negative samples from a plurality of samples. For example, the determination module 402 may select the positive samples from the samples based on one or more selection criteria related to one or more target features and feature information related to the target feature(s) of each sample. In some embodiments, the determination module 402 may determine one or more core features of the positive samples based on a trained binary model. The trained binary model may be generated using the (expanded) first feature vectors and the (expended) second feature vectors. Details regarding the determination of the core feature(s) of the positive samples may be found elsewhere in the present disclosure. See, e.g., operation 540 in FIG. 5 and the relevant descriptions thereof.

The training module 403 may be configured to train a model. For example, the training module 404 may generate a trained binary model by training a preliminary binary model using the (expanded) first feature vectors and the (expended) second feature vectors. The trained binary model may be used to identify the core feature(s) of positive samples. Details regarding the generation of the trained binary model may be found elsewhere in the present disclosure. See, e.g., (e.g., operation 540 in FIG. 5 and the relevant descriptions thereof).

The generation module 404 may be configured to generate a virtual profile of the positive samples. The virtual profile may include one or more first reference values corresponding to one or more core feature(s) of the positive sample. In some embodiments, the generation module 404 may determine a first reference value of a core feature based on feature values of the core feature in the first feature vectors of the positive samples. In some embodiments, the generation module 404 may generate the virtual profile based on a selected group of positive samples. For example, the generation module 404 may remove one or more outliers from the positive samples, and then generate a virtual profile based on the remaining positive samples. More descriptions regarding the generation of the virtual profile may be found elsewhere in the present disclosure. See, e.g., operation 550 in FIG. 5 and the relevant descriptions thereof.

It should be noted that the above description of the processing engine 112 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, any module mentioned above may be divided into two or more units. For example, the determination module 402 may be divided into two units, one of which is configured to determine the expanded first and second feature vectors, and the other is configured to determine the core features of the positive samples. In some embodiments, the processing engine 112 may further include one or more additional modules. For example, the processing engine 112 may further include a storage module (not shown in FIG. 4) configured to store data generated by the modules of the processing engine 112.

Figure 5:
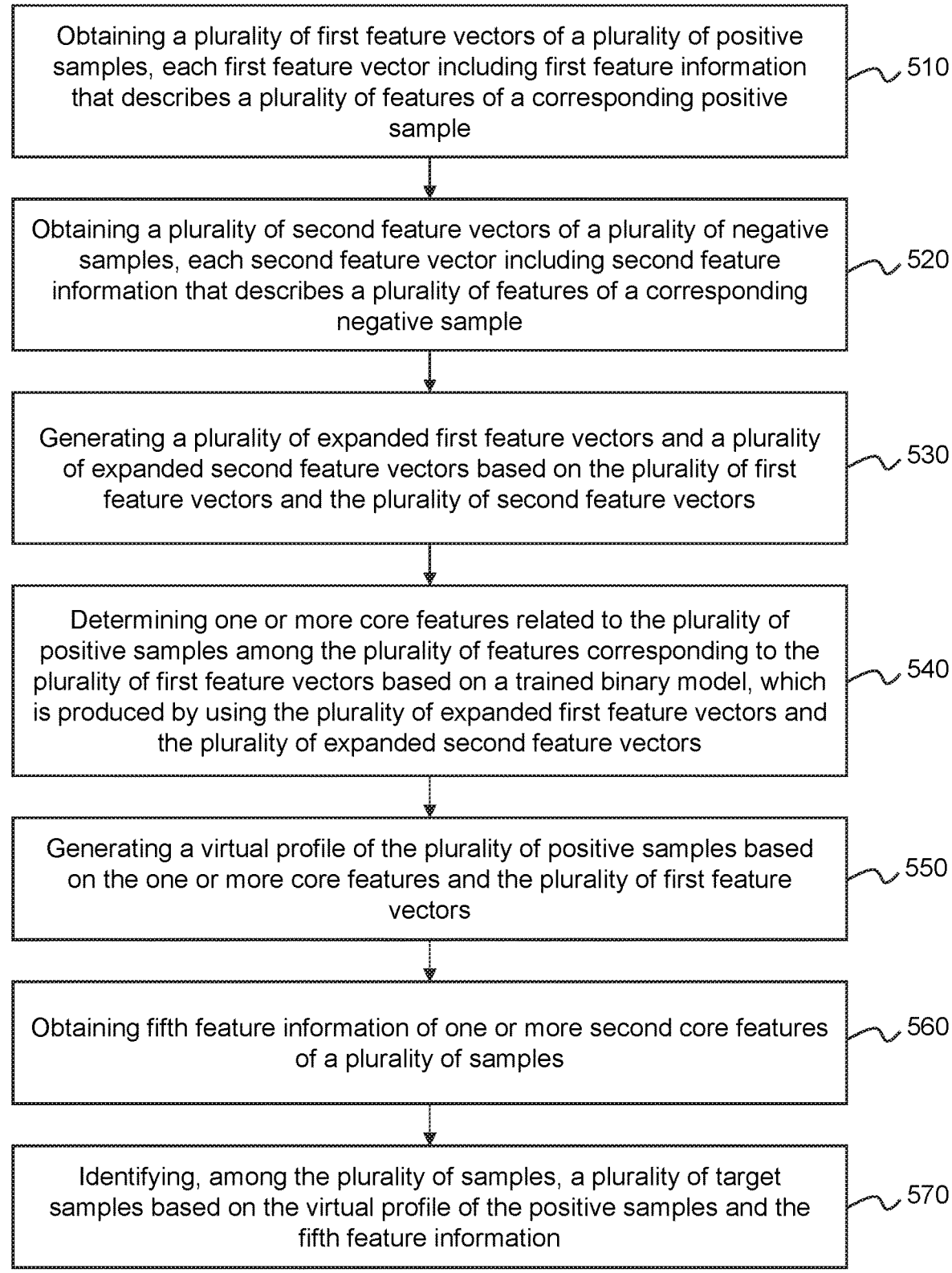
FIG. 5 is a flowchart illustrating an exemplary process for generating a virtual profile of users according to some embodiments of the present disclosure.

FIG. 5 is a flowchart illustrating an exemplary process for generating a virtual profile of users according to some embodiments of the present disclosure. At least a portion of process 500 may be implemented on the computing device 200 as illustrated in FIG. 2 or the mobile device 300 as illustrated in FIG. 3. In some embodiments, one or more operations of process 500 may be implemented in the O2O service system 100 as illustrated in FIG. 1. In some embodiments, one or more operations in the process 500 may be stored in the storage device 160 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110). In some embodiments, the instructions may be transmitted in a form of electronic current or electrical signals.

In 510, the processing engine 112 (e.g., the obtaining module 401) may obtain a plurality of first feature vectors of a plurality of positive samples. Each first feature vector may include first feature information that describes a plurality of features of a corresponding positive sample in the plurality of positive samples.

The positive samples may include a group of samples to be analyzed. For example, the positive samples may include a number of core service requesters for an O2O service (e.g., a taxi-hailing service, a chauffeur service, an express car service, a carpool service, a bus service, a driver-for-hire service, a shuttle service, a take-out service, etc.) in the O2O service system 100. As another example, the positive samples may include a number of service provider(s) with good performance (e.g., service providers whose performance scores exceed a threshold) in the O2O service system 100. In some embodiments, such positive samples can be identified with certain values of one or more target features (e.g. the number of completed trips within a predetermined period of time being more than a threshold). In some embodiments, the positive samples may be analyzed to identify one or more core features of the positive samples and optionally generate a corresponding virtual profile. Here, O2O service systems are used as examples to illustrate how the present invention may be implemented.

In some embodiments, the positive samples may be provided by a user of the O2O service system 100. Merely by way of example, a user may input a list of positive samples or select the positive samples among a plurality of samples via a user terminal (e.g., a requester terminal 130, a provider terminal 140).

In some embodiments, the positive samples may be selected from a plurality of samples (e.g. all the samples, samples in a fixed time period, samples in a geographical region, etc.) by the processing engine 112 (e.g., the determination module 402), either automatically or manually. The selection of the positive samples may be performed according to one or more selection criteria related to one or more target features. A target feature may be a feature used to distinguish the positive samples from the plurality of samples. For example, the number of historical service orders may be a target feature that can distinguish core service requesters from the whole service requesters of the O2O service system 100. In some embodiments, a core service requester refers to a service requester who has frequently made request for the O2O service provided in the O2O service system 100, for example, who have made more than a certain number of requests in a predetermined period. As another example, the number of complaints and/or a drinking history may be a target feature that can distinguish service providers with poor performance from the whole service providers of the O2O service system 100. A selection criterion related to a target feature may include, for example but not limited to, a threshold value and/or a desired value or range of the target feature. Merely by way of example, a selection criterion related to the number of historical service orders may be "greater than 10", and a selection criterion related to the drinking history may be "having a drunk driving history". In some embodiments, the one or more selection criteria related to the target feature(s) may be a default setting stored in a storage device (e.g., the storage device 160) or be set by a user of the O2O service system 100 via a terminal. In some embodiments, the one or more selection criteria can be based on a default setting and adjustable by a user of the service system 100 via a terminal.

In some embodiments, to select the positive samples from the plurality of samples, the determination module 402 may obtain the one or more selection criteria related to the target feature(s), and also obtain third feature information of the target feature(s) of the plurality of samples. The third feature information may include, for example, feature values of the target feature(s) of each sample. The determination module 402 may further select the positive samples from the plurality of samples based on the third feature information and the selection criteria. For example, for each sample, the determination module 402 may determine whether the corresponding third feature information satisfies the selection criteria related to the target feature(s). In response to a determination that the third feature information of the sample satisfies the one or more selection criteria, the determination module 402 may designate the sample as a positive sample.

In some embodiments, a first feature vector of a positive sample may include first feature information, such as feature values of a plurality of features of the positive sample. The plurality features encoded in the first feature vector may vary with different scenarios. Taking a car-hailing service platform as an example, in certain embodiments, the positive samples may be all passengers or a selected group of passengers, and the corresponding features may include, such as but not limited to age, gender, profession, personality, hobby, level of education, income, consumption index, residence, credit information, the number of historical service orders, travel time, travel ways, historical start locations and destinations, or the like, or any combination thereof. In certain embodiments, the positive samples may be all drivers or selected group of drivers, and the corresponding features may include, such as but not limited to age, gender, profession, personality, hobby, level of education, income, residence, credit information, drinking history, working time, performance scores evaluated by passengers, the number of complaints received from passengers, or the like, or any combination thereof.

In some embodiments, the first feature vector may be expressed as a vector with one column or one row. For example, the first feature vector may be a row vector expressed as a 1×N determinant (e.g., a 1×108 determinant). In some embodiments, the first feature vector may correspond to an N-dimensional coordinate system. The N-dimensional coordinate system may be associated with N features. In some embodiments, the processing engine 112 may process one or more first feature vectors at once. For example, m first features vectors (e.g., three-row vectors) may be integrated into a 1×mN vector or an m×N matrix, where m is an integer.

In some embodiments, the obtaining module 401 may obtain the first feature vectors from one or more components in the O2O service system 100, such as a storage device (e.g., the storage device 160), or a user terminal (e.g., the service requester terminal 130, the service provider terminal 140). Additionally or alternatively, the obtaining module 401 may obtain at least part of the first feature vectors from an external source via the network 120. For example, the obtaining module 401 may obtain part or all of the first feature information from, for example but not limited to, one or more social websites, and/or a user profile database.

In 520, the processing engine (e.g., the obtaining module 401) may obtain a plurality of second feature vectors of a plurality of negative samples. Each second feature vector may include second feature information that describes the plurality of features of a corresponding negative sample in the plurality of negative samples.

In some embodiments, the positive samples and the negative samples may be selected from a plurality of samples (e.g. all the samples, samples in a fixed time period, samples in a geographical region, etc.). In certain embodiments, the negative samples may include any sample among the plurality of samples other than the positive samples. For example, the negative samples may be the rest of the samples in the plurality of samples after the positive samples have been selected; or the negative samples may be selected based on one or more criteria. In some embodiments, the negative samples may be used as a group of reference samples of the positive samples in the analyzing of the positive samples. Merely by way of example, the positive samples may include a plurality of active users (e.g., who have made requests for more than a certain times in a preset period), and the negative samples may include a plurality of inactive users and/or randomly selected users. The feature vectors of the positive samples and the negative samples may be analyzed to identify a plurality of core features of the active users.

As described in connection with 510, the positive samples may be selected from the plurality of samples according to the one or more selection criteria related to the target feature(s) and the third feature information of the target feature(s) of the samples. In some embodiments, the processing engine 112 (e.g., the determination module 402) may also select the negative samples from the samples according to the third feature information and the one or more selection criteria. For example, the determination module 402 may select one or more samples whose third feature information doesn't satisfy the one or more selection criteria as the negative samples. Take age as an example, if the selection criterion for the age of positive samples is less than 50, the determination module 402 may select the samples (e.g. users, drivers, passengers, etc.) whose age is equal to or greater than 50 as the negative samples.

In some embodiments, the determination module 402 may randomly select a plurality of preliminary negative samples from the samples other than the positive samples. The preliminary negative samples may be directly designated as the negative samples, or be further selected for before designation. In certain embodiments, the obtaining module 401 may obtain fourth feature information of the target feature(s) of the preliminary negative samples; and the determination module 402 may then select one or more preliminary negative samples whose fourth feature information doesn't satisfy the one or more selection criteria as the negative samples. In some embodiments, the number of the negative samples may be the same as or different from that of the positive samples.

A second feature vector of a negative sample may include second feature information, such as feature values of the features of the negative samples. In some embodiments, the first feature vectors of the positive samples and the second feature vectors of the negative samples may include the same kind of features from which the core features of the positive samples are identified. In certain embodiments, the first feature vectors and/or the second feature vectors may respectively further include one or more features different from each other.

In some embodiments, the obtaining module 401 may obtain the second feature vectors from one or more components in the O2O service system 100, such as a storage device (e.g., the storage device 160), or a user terminal (e.g., the service requester terminal 130, the service provider terminal 140). Additionally or alternatively, the obtaining module 401 may obtain at least part of the second feature vectors from an external source via the network 120. For example, the obtaining module 401 may obtain part or all of the second feature information from, for example but not limited to, one or more social websites, and/or a user profile database.

In 530, the processing engine (e.g., the determination module 402) may generate a plurality of expanded first feature vectors and a plurality of expanded second feature vectors based on the first feature vectors and the second feature vectors.

In some embodiments, the expanded first feature vectors may be generated based on the first feature vectors of the positive samples. Merely by way of example, the determination module 402 may determine a first vector difference between a pair of first feature vectors among the first feature vectors, and designate the first vector difference as one of the expanded first feature vectors. An expanded first feature vector corresponding to a pair of first feature vectors may indicate a difference of feature information between the two first feature vectors.

In some embodiments, the expanded second feature vectors may be generated based on the first feature vectors of the positive samples and the second feature vectors of the negative samples. Merely by way of example, the determination module 402 may determine a second vector difference between a pair of a first feature vector and a second feature vector, and designate the second vector difference as one of the expanded second feature vectors. An expanded second feature vector corresponding to a pair of first feature vector and second feature vector may indicate a difference of feature information between the first and second feature vector.

In some embodiments, the determination module 402 may normalize the first feature vectors and the second feature vectors, and then determine the expanded first feature vectors and the expanded second feature vectors based on the normalized first feature vectors and the normalized second feature vectors. More descriptions regarding the determination of the expanded first feature vectors and the expanded second feature vectors may be found elsewhere in the present disclosure. See, e.g., FIG. 6 and the relevant descriptions thereof.

In some embodiments, the number of the expanded first feature vectors may be equal to or greater than the number of the first feature vectors. For example, if there are M first feature vectors and all the first feature vectors are fully used for determining the expanded first feature vectors, M(M−1)/2 pairs of first feature vectors and M(M−1)/2 expanded first feature vectors may be determined accordingly. M(M−1)/2 may be greater than M if M is an integer greater than 3. Similarly, the number of the expanded second feature vectors may be equal to or greater than the number of the second feature vectors. For example, if there are M first feature vectors and N second feature vectors and all the first feature vectors and the second feature vectors are fully used for determining the expanded second feature vectors, M*N pairs of first feature vector and second feature vector and M*N expanded second feature vectors may be determined accordingly. If M and N are integers greater than 1, M×N may be equal or greater than M and/or N. With such an approach, the sample size may be enlarged, providing a more accurate and effective identification of the core features of the positive samples.

It should be noted that the sample size, or the number of feature vectors, can be expanded with various approaches that illustrate, preserve, or distinguish the difference between the first feature vectors and the second feature vectors. For example, the expanded first feature vectors and second feature vectors can be determined by using a portion, not all, of the first feature vectors and second feature vectors. In addition, it would be possible that 530 can be omitted and the first feature vectors and second feature vectors are used directly for the determination of core features.

In 540, the processing engine 112 (e.g., the determination module 402) may determine one or more core features related to the plurality of positive samples among the plurality of features based on a trained binary model.

In some embodiments, the trained binary model may be generated by the processing engine 112 (e.g., the training module 403) by training a preliminary binary model using the expanded first feature vectors and the expanded second feature vectors. The preliminary binary model may be a logistic regression model, a linear model, or any other binary model. In the generation of the trained binary model, the expanded first feature vectors and the expanded second feature vectors may be regarded as two separate classifications. The training module 403 may input each expanded first and expanded second feature vector into the preliminary binary model to produce a corresponding predicted classification. In certain embodiments, the training module 403 may further determine a difference between the predicted classifications and known classifications of the expanded first and expanded second feature vectors, which is referred to as a loss function for brevity. According to the loss function, the training module 403 may further adjust the preliminary binary model (e.g., one or more model parameters) until the loss function reaches a desired value. After the loss function reaches the desired value, the adjusted preliminary binary model may be designated as the trained binary model.

In some embodiments, the adjusted model parameters may include a plurality of weights of the features of the expanded first or expanded second feature vectors. A weight of a feature may indicate an impact of the feature on whether an expanded feature vector can be categorized as an expanded first feature vector (or whether a feature vector is actually a first feature vectors). In other words, a weight of a feature may indicate an importance of the feature for the positive samples. Accordingly, the one or more core features of the positive samples may be determined based on the trained binary model. In some embodiments, the trained binary model may be determined by the training module 403 and stored in a storage device in O2O service system 100, such as the storage device 160, the ROM 230, the RAM 240, or the like. The determination module 402 may retrieve the trained binary model from the storage device and determine the core feature(s) accordingly.

In some embodiments, to determine the core feature(s) of the positive samples, the determination module 402 may determine the weights of the features based on the trained binary model; and the determination module 402 may further rank the features according to the corresponding weights in, for example, a descending order. In certain embodiments, the determination module 402 may assign an importance score to each feature according to the corresponding weight, and rank the features based on the importance scores. Based on the ranking result, the determination module 402 may determine the core feature(s). For example, the features in front of the ranking list, for example but not limited to, top 5, top 10, to 20, or top 50 features, or top 2%, top 5%, top 10%, top 15%, or top 20% of the features may be selected and designated as the core features of the positive samples.

In 550, the processing engine 112 (e.g., the generation module 404) may generate a virtual profile of the positive samples based on the core feature(s) and the first feature vectors. The virtual profile may be a profile that describes the core feature(s) of the positive samples. Each core feature may have a corresponding first reference value in the virtual profile. In some embodiments, the first reference value(s) of the core feature(s) in the virtual profile may be represented or recorded in the form of a vector, a table, or the like, or any combination thereof.

In some embodiments, the generation module 404 may determine the first reference value of a core feature based on the feature values of the core feature in the first feature vectors. In certain embodiments, the first reference value of the core feature may be, such as but not limited to an average feature value, an intermediate feature value, a maximum feature value, a minimum feature value, or a feature value range of the core feature in the first feature vectors. Merely by way of example, the first reference value of age may be an average age of the positive samples (e.g. selected drivers or passengers), which is determined based on the feature values of age in the first feature vectors. In some embodiments, the first reference values of different core features may be determined in the same way or in different ways. For example, the first reference value of each core feature may be an average feature value of the positive samples. As another example, the first reference value of age may be an average age of the positive samples while the first reference value of income may be a range of income of the positive samples.

In some embodiments, the generation module 404 may generate the virtual profile based on a selected group of positive samples. For example, the generation module 404 may remove one or more outliers from the plurality of positive samples, and then generate a virtual profile based on the remaining positive samples. The outlier(s) may include one or more positive samples whose feature values of one or more core features deviate from the overall level of the one or more core features of the whole positive samples. Take age as an example, the overall age level of the positive samples may be measured by, such as but not limited to an average age, or an intermediate age, an age range of the positive samples. A positive sample whose age significantly deviates from the overall level of age may be regarded as an outlier. For example, a positive sample may be regarded as an outlier if his or her age is 30 years or 50% percentage more than the median age. Additionally or alternatively, the outlier(s) may include one or more positive samples whose feature values of one or more core features are similar to the overall level of the one or more core features of the negative samples. More descriptions of the removing of the outlier(s) may be found elsewhere in the present disclosure. See., e.g., FIG. 7 and the relevant descriptions thereof.

After the core features and the corresponding first reference values of the positive samples are determined, the processing engine 112 may further identify, among a plurality of samples, a plurality of target samples accordingly. The target samples may have highly similar feature values of the core feature(s) to the positive samples. Alternatively, the target samples may have highly dissimilar feature values of the core feature(s) to the positive samples. For illustration purposes, the determination of the target samples who have highly similar feature values of the core feature(s) to the positive samples is described hereinafter as an example.

In 560, the processing engine 112 (e.g., the obtaining module 401) may obtain fifth feature information of the determined one or more core features (also referred as to one or more second core features) of a plurality of samples. In some embodiments, the fifth feature information may include feature values of the one or more core features of each sample. In some embodiments, the fifth feature information may include feature values of all the core features of each sample. In some embodiments, the plurality of samples may include a plurality of users of the O2O service system 100, for example, a plurality of service requesters or service providers of an O2O service.

In some embodiments, the obtaining module 401 may obtain the fifth feature information from one or more components in the O2O service system 100, for example, such as a storage device (e.g., the storage device 160), or one or more user terminals (e.g., the service requester terminal 130, the service provider terminal 140). Additionally or alternatively, the obtaining module 401 may obtain at least part of the fifth feature information from an external source, such as but not limited to one or more social websites, or a user profile database via the network 120.

In 570, the processing engine 112 (e.g., the determination module 402) may identify, among the plurality of samples, the plurality of target samples based on the virtual profile of the positive samples and the fifth feature information. The target samples may have similar feature value(s) of the core feature(s) as the positive samples.

In some embodiments, the determination module 402 may identify the target samples by comparing the first reference values of the core features of the positive samples with the fifth feature information, i.e., feature values of the core features of the samples. For example, for a sample, the determination module 402 may determine a difference between the first reference value of each core feature and the corresponding feature value of the sample. The determination module 402 may further determine whether the difference corresponding to each core feature is less than a first threshold corresponding to the core feature. In certain embodiments, in response to a determination that the difference corresponding to each core feature is less than the first threshold corresponding to the core feature, the determination module 402 may designate the sample as a target sample. In certain embodiments, in response to a determination that the differences corresponding to a portion of core features, for example, 50%, 60%, 70%, 80%, 90%, or 95% of core features are less than the respective first threshold, the determination module 402 may designate the sample as a target sample. In some embodiments, the first thresholds corresponding to different core features may be the same or different.

In some embodiments, for a sample, the determination module 402 may further determine a compound difference between the first reference values of the core features and the corresponding fifth feature information based on the difference corresponding to each core feature. The compound difference may be, for example but not limited to a sum, a weighted sum, an average value, a medium value of the difference corresponding to each of the one or more core features. In certain embodiments, the compound difference may be a weighted sum determined based on the differences corresponding to the core feature(s) and the weights of the core feature(s), as determined based on the trained binary model in operation 540. The determination module 402 may then determine whether the compound difference is less than a second threshold. In response to a determination that the compound difference is less than the second threshold, the determination module 402 may designate the sample as a target sample.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, 530 may be omitted. In 540, the core feature(s) of the positive samples may be determined based on a trained binary model that is produced by using the first and second feature vectors. As another example, any one of 550 to 570 may be omitted. In some embodiments, only a portion of the core features of the positive samples may be described in the virtual profile generated in 550.

Figure 6:
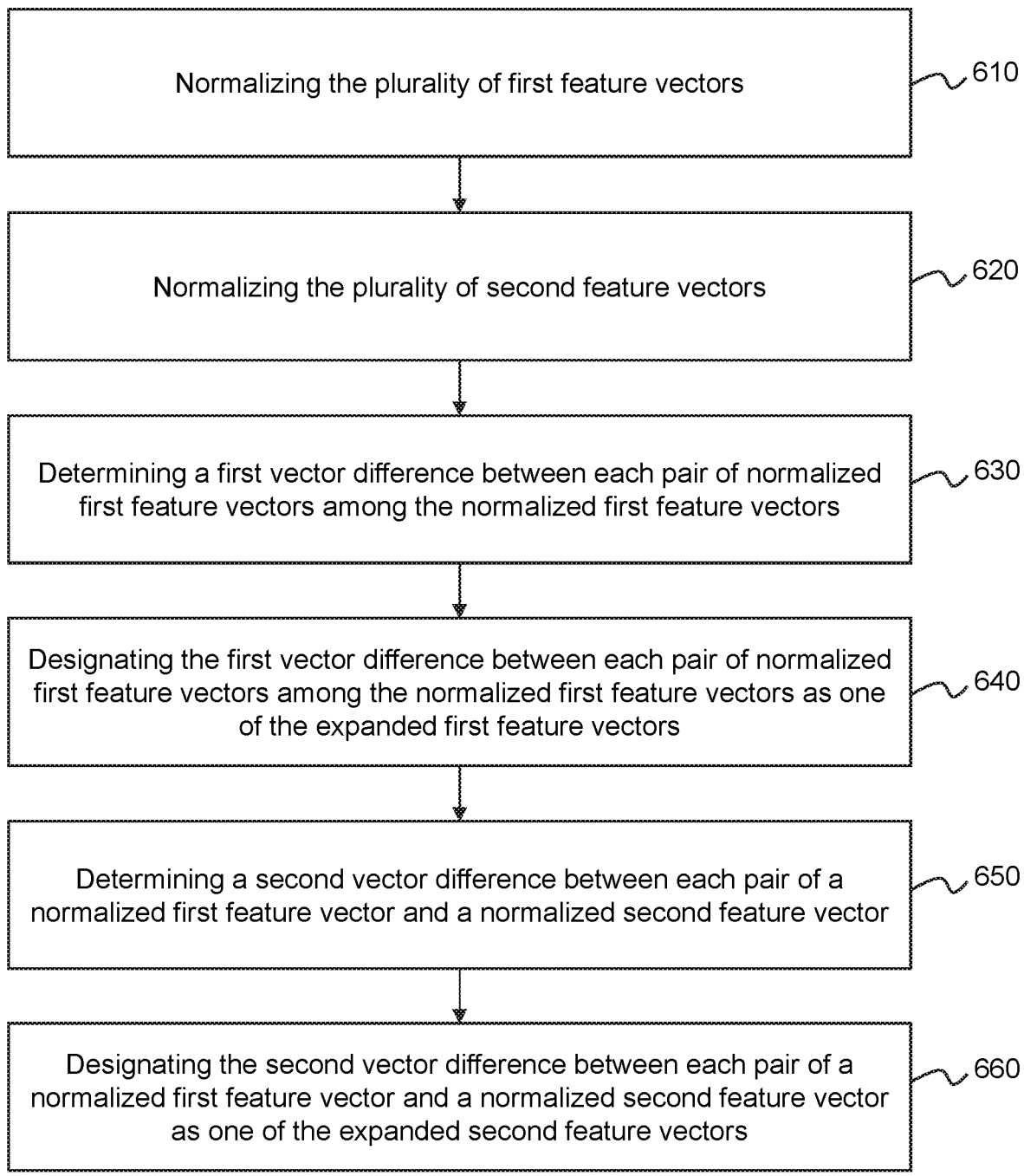
FIG. 6 is a flowchart illustrating an exemplary process for determining expanded first feature vectors and expanded second feature vectors according to some embodiments of the present disclosure.

FIG. 6 is a flowchart illustrating an exemplary process for determining expanded first feature vectors and expanded second feature vectors according to some embodiments of the present disclosure. At least a portion of process 600 may be implemented on the computing device 200 as illustrated in FIG. 2 or the mobile device 300 as illustrated in FIG. 3. In some embodiments, one or more operations of process 600 may be implemented in the O2O service system 100 as illustrated in FIG. 1. In some embodiments, one or more steps in the process 600 may be stored in the storage device 160 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110). In some embodiments, part or all of the process 600 may be performed to achieve operation 530 as described in connection with FIG. 5.

In 610, the processing engine 112 (e.g., the determination module 402) may normalize the plurality of first feature vectors. In 620, the processing engine 112 (e.g., the determination module 402) may normalize the plurality of second feature vectors.

As used herein, the normalization of a feature vector may refer to normalizing the feature values of some or all features of the feature vector to a particular interval, such as but not limited to [0,1] or [−1,1]. As described in connection with FIG. 5, the first feature vectors may include feature values of a plurality of features of the positive samples, and the second feature vectors may include feature values of the plurality of features of the negative samples. In some embodiments, since value ranges of different features may vary widely, features with large numerical values may dominate the generation of the trained binary model, which may result in an inaccurate identification of core features of the positive samples. Therefore, the value ranges of the features of the first feature vectors and/or the second feature vectors may need to be normalized to a uniform interval. In some embodiments, the normalization of the first or second feature vectors may be performed based on a min-max normalization technique, a Z-score normalization technique, a nonlinear normalization technique, or the like, or any combination thereof. In certain embodiments, the feature values of the features of the first and second feature vectors may be normalized to an interval [0,1].

In 630, the processing engine 112 (e.g., the determination module 402) may determine a first vector difference between each pair of normalized first feature vectors among the normalized first feature vectors. In 640, the processing engine 112 (e.g., the determination module 402) may designate the first vector difference between each pair of normalized first feature vectors as one of the expanded first feature vectors. The first vector difference between a pair of normalized first feature vectors may be determined by subtracting one normalized first feature vector from the other normalized first feature vector. In some embodiments, for a pair of normalized first feature vectors A and B, the vector difference between A and B may include (A-B) or (B-A), only one of which may be designated as an expanded first feature vector.

In 650, the processing engine 112 (e.g., the determination module 402) may determine a second vector difference between each pair of a normalized first feature vector and a normalized second feature vector. In 660, the processing engine 112 (e.g., the determination module 402) may designate the second vector difference between each pair of a normalized first feature vector and a normalized second feature vector as one of the expanded second feature vectors. In some embodiments, the second vector difference between each pair of a normalized first feature vector and a normalized second feature vectors may be determined by subtracting the normalized first feature vector from the normalized second feature vector. In some embodiments, the second vector difference between each pair of a normalized first feature vector and a normalized second feature vectors may be determined by subtracting the normalized second feature vector from the normalized first feature vector.

It should be noted that the above description of the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, 610 and 620 may be omitted. In 630, a first vector difference between each pair of first feature vectors of the first feature vectors may be determined. In 650, a second vector difference between each pair of first and second feature vector may be determined.

Figure 7:
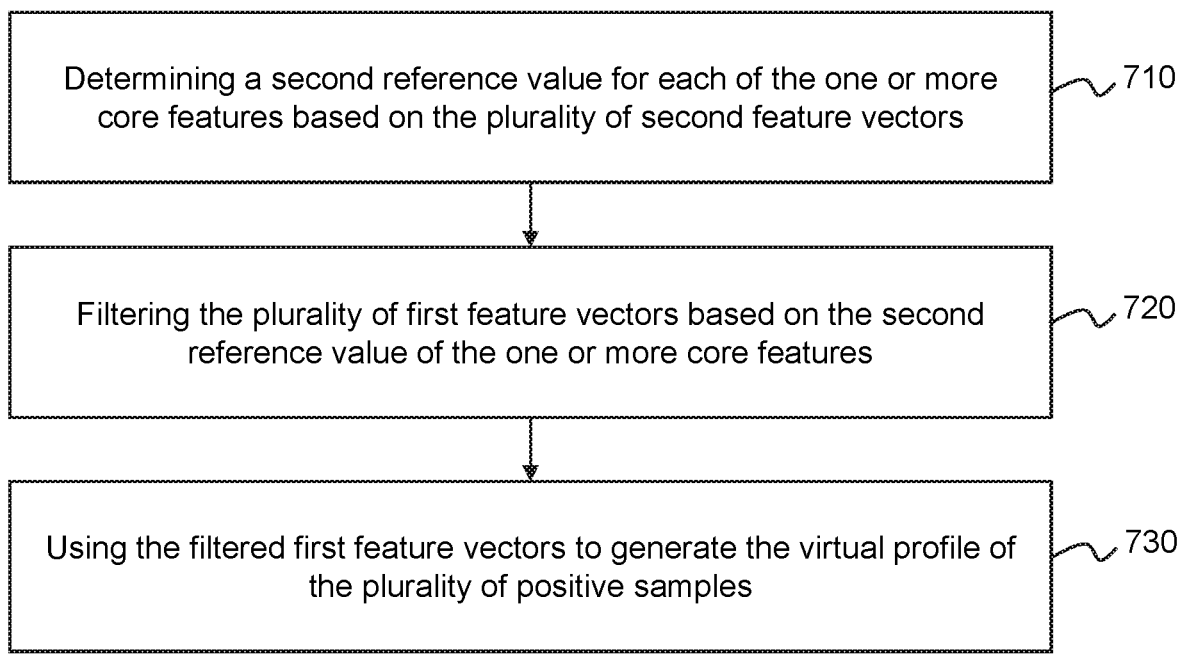
FIG. 7 is a flowchart illustrating an exemplary process for generating a virtual profile of users according to some embodiments of the present disclosure.

FIG. 7 is a flowchart illustrating an exemplary process for generating a virtual profile of users. At least a portion of process 700 may be implemented on the computing device 200 as illustrated in FIG. 2 or the mobile device 300 as illustrated in FIG. 3. In some embodiments, one or more operations of process 700 may be implemented in the O2O service system 100 as illustrated in FIG. 1. In some embodiments, one or more operations in the process 700 may be stored in the storage device 160 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110). In some embodiments, part or all of the process 700 may be performed to achieve operation 550 as described in connection with FIG. 5.

In 710, the processing engine 112 (e.g., the generation module 404) may determine a second reference value for each of the one or more core features based on the plurality of second feature vectors.

As described in connection with 550, before the virtual profile of the positive samples is generated, the generation module 404 may remove one or more outliers from the positive samples. In certain embodiments, one or more positive samples who have similar feature values of one or more core feature(s) as the negative samples may be regarded as outliers and be removed from the positive samples. In order to identify such positive sample(s), a second reference value for each core feature may be determined based on the second feature vectors of the negative samples. A second reference value for a core feature that is determined based on the second feature vectors may reflect the overall level of the core feature of the negative samples.

In some embodiments, the second reference value of a core feature may be, such as but not limited to an average feature value, an intermediate feature value, a maximum feature value, a minimum feature value, or a feature value range of the core feature of the second feature vectors. Merely by way of example, the second reference value of age may be an average age of the negative samples, which is determined based on the feature values of age in the second feature vectors. In some embodiments, the second reference values of different core features may be determined in the same way or in different ways. For example, the second reference value of each core feature may be an average feature value of the negative samples. As another example, the second reference value of age may be an average age of the negative samples while the second reference value of income may be a range of income of the negative samples.

In 720, the processing engine 112 (e.g., the generation module 404) may filter the plurality of first feature vectors based on the second reference value. In some embodiments, the generation module 404 may filter first feature vectors by comparing the second reference values of the core features with the corresponding feature values of the core features of the first feature vectors, and remove the first feature vectors who have similar values of the core features as the negative samples.

Merely by way of example, for a first feature vector, the generation module 404 may determine a difference between the second reference value of each core feature and the corresponding feature value of the first feature vector; then the generation module 404 may determine whether the difference corresponding to each core feature is less than a third threshold corresponding to the core feature. In certain embodiments, in response to a determination that the difference corresponding to each core feature is less than the corresponding third threshold, the generation module 404 may filter or remove the first feature vector from the plurality of first feature vectors. In certain embodiments, in response to a determination that the differences corresponding to a portion of the core features, for example, 50%, 60%, 70%, 80%, 90% of core features are less than the respective third threshold, the generation module 404 may filter or remove the first feature vector from the plurality of first feature vectors. In some embodiments, the thresholds corresponding to different core features may be the same or different.

In some embodiments, for a first feature vector, the determination module 402 may further determine a compound difference between the second reference values of the core features and the corresponding feature values of the first feature vectors based on the difference corresponding to each core feature. The compound difference may be, for example but not limited to a sum, a weight sum, an average value, a medium value of the difference corresponding to each of the one or more core features. In certain embodiments, the compound difference may be a weight sum determined based on the differences corresponding to the core features and the weights of the core features, as determined based on the trained binary model in operation 540. The determination module 402 may then determine whether the compound difference is less than a fourth threshold. In response to a determination that the compound difference is less than the fourth threshold, the determination module 402 may remove the first feature vector from the plurality of first feature vectors.

In 730, the processing engine 112 (e.g., the generation module 404) may use the filtered first feature vectors to generate the virtual profile of the plurality of positive samples. The virtual profile of the positive samples may include one or more first reference values of the core features as described in connection with 550. A first reference value of a core feature may be determined based on feature values of the core feature of the filtered first feature vectors. For example, the first reference value of the core feature may be an average feature value, an intermediate feature value, a maximum feature value, a minimum feature value, or a feature value range of the core feature of the filtered first feature vectors.

In some embodiments, after the virtual profile is generated, it can be used to identify target samples (e.g. users) based on the virtual profile. In certain embodiments, the target samples may be highly similar to a virtual positive sample that has the virtual profile. In certain embodiments, the target samples may be highly dissimilar to a virtual positive sample that has the virtual profile. The generation the virtual profile allows for more precise targeting of further activities (e.g. marketing).

It should be noted that the above description of the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the generation module 404 may determine a second reference value for a portion of the core features based on the second feature vectors, and filter the first feature vectors based on the determined second reference value(s). For example, only core features with high weights, as determined based on the trained binary model in operation 540, may be selected to determine a corresponding second reference value. The first feature vectors who have similar feature values of the selected core features as the negative samples may be removed in the generation of the virtual profile.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
at least one storage medium including a set of instructions for user mining;
at least one processor in communication with the at least one storage medium, wherein when executing the set of instructions, the at least one processor is directed to:
obtain a plurality of first feature vectors of a plurality of positive samples, each first feature vector including first feature information that describes a plurality of features of a corresponding positive sample in the plurality of positive samples;
obtain a plurality of second feature vectors of a plurality of negative samples, each second feature vector including second feature information that describes a plurality of features of a corresponding negative sample in the plurality of negative samples;
determine, based on the plurality of first feature vectors and the plurality of second feature vectors, a plurality of expanded first feature vectors and a plurality of expanded second feature vectors; and
determine, among the plurality of features corresponding to the plurality of first feature vectors, one or more core features related to the plurality of positive samples based on a trained binary model, which is produced by using the plurality of expanded first feature vectors and the plurality of expanded second feature vectors.

2. The system of claim 1, wherein to obtain the plurality of first feature vectors of the plurality of positive samples, the at least one processor is directed to:
   obtain one or more selection criteria related to one or more target features;
   obtain third feature information of the one or more target features of a plurality of samples; and
   select, based on the third feature information and the one or more selection criteria, the plurality of positive samples from the plurality of samples.

3. The system of claim 2, wherein to obtain the plurality of second feature vectors of the plurality of negative samples, the at least one processor is further directed to:
   select, among the plurality of samples, a plurality of preliminary negative samples;
   obtain fourth feature information of the one or more target features of the plurality of preliminary negative samples; and
   select, among the plurality of preliminary negative samples, the plurality of negative samples based on the fourth feature information and the one or more selection criteria.

4. The system of claim 1, wherein to determine the plurality of expanded first feature vectors and the plurality of expanded second feature vectors, the at least one processor is further directed to:
   determine a first vector difference between each pair of first feature vectors among the plurality of first feature vectors;
   designate the first vector difference between each pair of first feature vectors among the plurality of first feature vectors as one of the expanded first feature vectors;
   determine a second vector difference between each pair of a first feature vector and a second feature vector; and
   designate the second vector difference between each pair of a first feature vector and a second feature vector as one of the expanded second feature vectors.

5. The system of claim 1, wherein to determine the plurality of expanded first feature vectors and the plurality of second feature vectors, the at least one processor is further directed to:
   normalize the plurality of first feature vectors;
   normalize the plurality of second feature vectors; and
   determine, based on the plurality of normalized first feature vectors and the plurality of normalized second feature vectors, the plurality of expanded first feature vectors and the plurality of expanded second feature vectors.

6. The system of claim 1, the at least one processor is further directed to:
   generate, based on the one or more core features and the plurality of first feature vectors, a virtual profile of the plurality of positive samples, wherein each of the one or more core features has a corresponding first reference value in the virtual profile.

7. The system of claim 6, wherein to generate the virtual profile of the plurality of positive samples, the at least one processor is further directed to:
   determine, based on the plurality of first feature vectors, an average feature value for each of the one or more core features; and
   designate the average feature value as the first reference value for the corresponding core feature for the virtual profile.

8. The system of claim 6, wherein to generate the virtual profile of the plurality of positive samples, the at least one processor is further directed to:
   determine, based on the plurality of second feature vectors, a second reference value for each of the one or more core features;
   filter the plurality of first feature vectors based on the second reference value of each of the one or more core features; and
   use the filtered first feature vectors to generate the virtual profile of the plurality of positive samples.

9. The system of claim 6, wherein the at least one processor is further directed to:
   obtain fifth feature information of the one or more second core features of a plurality of samples; and
   identify, among the plurality of samples, a plurality of target samples based on the virtual profile of the positive samples and the fifth feature information.

10. A method implemented on a computing device having at least one processor, at least one computer-readable storage medium, and a communication platform connected to a network, comprising:
    obtaining a plurality of first feature vectors of a plurality of positive samples, each first feature vector including first feature information that describes a plurality of features of a corresponding positive sample in the plurality of positive samples;
    obtaining a plurality of second feature vectors of a plurality of negative samples, each second feature vector including second feature information that describes a plurality of features of a corresponding negative sample in the plurality of negative samples;
    determining, based on the plurality of first feature vectors and the plurality of second feature vectors, a plurality of expanded first feature vectors and a plurality of expanded second feature vectors; and
    determining, among the plurality of features corresponding to the plurality of first feature vectors, one or more core features related to the plurality of positive samples based on a trained binary model, which is produced by using the plurality of expanded first feature vectors and the plurality of expanded second feature vectors.

11. The method of claim 10, wherein the obtaining the plurality of first feature vectors of the plurality of positive samples further comprises:
    obtaining one or more selection criteria related to one or more target features;
    obtaining third feature information of the one or more target features of a plurality of samples; and
    selecting, based on the third feature information and the one or more selection criteria, the plurality of positive samples from the plurality of samples.

12. The method of claim 11, wherein the obtaining the plurality of second feature vectors of the plurality of negative samples further comprises:
    selecting, among the plurality of samples, a plurality of preliminary negative samples;
    obtaining fourth feature information of the one or more target features of the plurality of preliminary negative samples; and
    selecting, among the plurality of preliminary negative samples, the plurality of negative samples based on the fourth feature information and the one or more selection criteria.

13. The method of claim 10, wherein the determining the plurality of expanded first feature vectors and the plurality of expanded second feature vectors further comprises:

determining a first vector difference between each pair of first feature vectors among the plurality of first feature vectors;

designating the first vector difference between each pair of first feature vectors among the plurality of first feature vectors as one of the expanded first feature vectors;

determining a second vector difference between each pair of a first feature vector and a second feature vector; and designating the second vector difference between each pair of a first feature vector and a second feature vector as one of the expanded second feature vectors.

14. The method of claim 10, wherein the determining the plurality of expanded first feature vectors and the plurality of second feature vectors further comprises:

normalizing the plurality of first feature vectors;

normalizing the plurality of second feature vectors; and determining, based on the plurality of normalized first feature vectors and the plurality of normalized second feature vectors, the plurality of expanded first feature vectors and the plurality of expanded second feature vectors.

15. The method of claim 10, wherein the determining the one or more core features related to the plurality of positive samples further comprises:

determining, based on the trained binary model, a plurality of weights of the plurality of features corresponding to the plurality of first feature vectors;

ranking, according to the plurality of weights, the plurality of features corresponding to the plurality of first feature vectors; and determining, based on a ranking result, the one or more core features among the plurality of features corresponding to the plurality of first feature vectors.

16. The method of claim 10, further comprises:

generating, based on the one or more core features and the plurality of first feature vectors, a virtual profile of the plurality of positive samples, wherein each of the one or more core features has a corresponding first reference value in the virtual profile.

17. The method of claim 16, wherein the generating the virtual profile of the plurality of positive samples comprises:

determining, based on the plurality of first feature vectors, an average feature value for each of the one or more core features; and designating the average feature value as the first reference value for the corresponding core feature for the virtual profile.

18. The method of claim 16, wherein the generating the virtual profile of the plurality of positive samples further comprises:

determining, based on the plurality of second feature vectors, a second reference value for each of the one or more core features;

filtering the plurality of first feature vectors based on the second reference value of each of the one or more core features; and using the filtered first feature vectors to generate the virtual profile of the plurality of positive samples.

19. The method of claim 16, further comprises:

obtaining fifth feature information of one or more second core features of a plurality of samples; and identifying, among the plurality of samples, a plurality of target samples based on the virtual profile of the positive samples and the fifth feature information.

20. A non-transitory computer-readable storage medium embodying a computer program product, the computer program product comprising instructions configured to cause a computing device to:

obtain a plurality of first feature vectors of a plurality of positive samples, each first feature vector including first feature information that describes a plurality of features of a corresponding positive sample in the plurality of positive samples;

obtain a plurality of second feature vectors of a plurality of negative samples, each second feature vector including second feature information that describes a plurality of features of a corresponding negative sample in the plurality of negative samples;

generate, based on the plurality of first feature vectors and the plurality of second feature vectors, a plurality of expanded first feature vectors and a plurality of expanded second feature vectors; and determine, among the plurality of features corresponding to the plurality of first feature vectors, one or more core features related to the plurality of positive samples based on a trained binary model, which is produced by using the plurality of expanded first feature vectors and the plurality of expanded second feature vectors.

\* \* \* \* \*